Dec. 28, 1926.  
P. V. MORGAN  
1,612,304  
RIM REMOVING TOOL  
Filed March 22, 1926   2 Sheets-Sheet 1
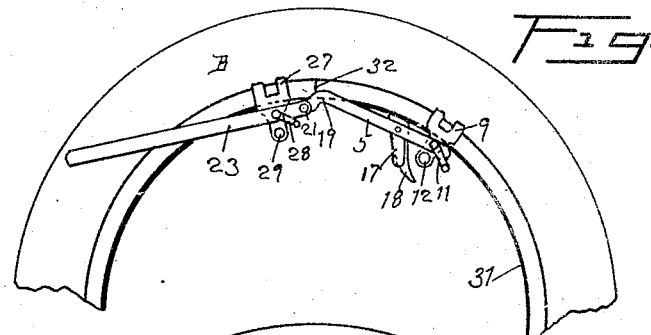
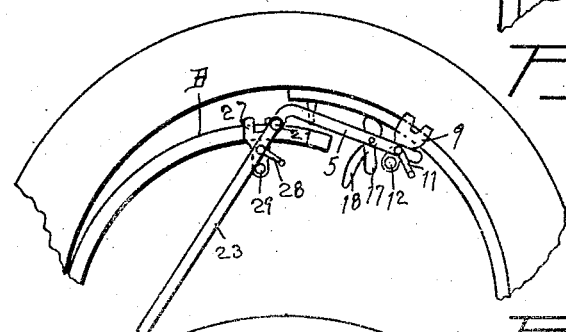
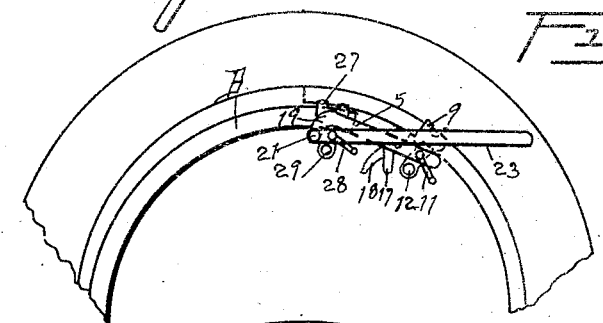
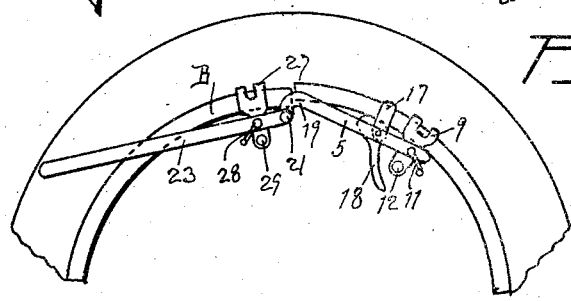
INVENTOR.  
P. V. MORGAN  
BY *Victor J. Evans*  
ATTORNEY.

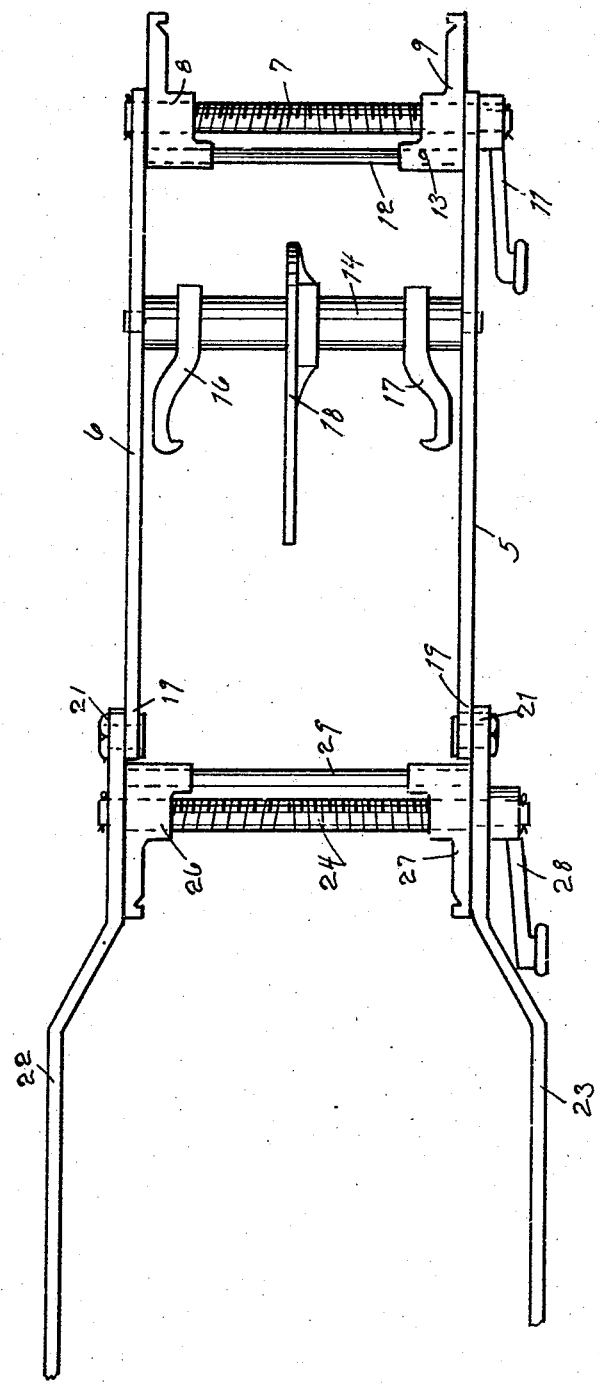

Patented Dec. 28, 1926.

1,612,304

UNITED STATES PATENT OFFICE.

PURLEY V. MORGAN, OF OAKLAND, CALIFORNIA.

RIM-REMOVING TOOL.

Application filed March 22, 1926. Serial No. 96,600.

This invention relates to improvements in rim removing tools, and has particular reference to a tool for contracting and expanding a demountable rim for the purpose of removing or replacing the automobile tire thereon.

The principal object of this invention is to produce a tool which may be readily attached to an ordinary split rim so that the rim may be easily contracted or expanded.

Another object is to produce a tool of this character which is adaptable to any ordinary rim without altering the construction of the rim.

A further object is to produce a tool which will permit the aligning of the rim ends irrespective of the fact that the rim may be sprung.

A still further object is to produce a tool of this character which is simple in construction and therefore cheap to manufacture.

Other objects and advantages will be apparent during the course of the following description.

In the accompanying drawings forming a part of this specification, and in which like numerals are employed to designate like parts throughout the same, Figure I is a fragmentary view of a tire and rim, having my tool applied thereto, Figure II is a view similar to Figure I, showing the tool in the position it will assume when the rim is being contracted, Figure III is a view similar to Figure II, showing the tool in the position it will assume when the rim is fully contracted, Figure IV is a view similar to Figure III, showing the tool in the position it will assume when the ends of the rim are to be aligned, and Figure V is an enlarged top plan view of my improved tool.

In removing rims from automobile tires it is exceedingly difficult to perform the operation due to the heavy metal out of which the rim is constructed. This results in the rim having an inherent tendency to remain expanded and consequently considerable effort must be exerted to contract the same. Many forms of tools have been devised for accomplishing this operation, which tools merely caused a breaking of the rim so as to remove the tire and in replacing the tire the rim is allowed to spring back of its own accord. Rims in use become sprung so that their ends are difficult to align. Therefore, I have devised a tool which will not only contract the rim for the purpose of removing the tire, but a tool which will also permit the expansion of the rim in such a manner that the ends of the rim may be easily aligned for the purpose of locking.

In the accompanying drawings wherein for the purpose of illustration is shown a preferred embodiment of my invention, the numerals 5 and 6 refer to parallel space members between one end of which is positioned a threaded member 7.

It will be noted that the threads on this member are both right and left hand threads the purpose of which is to threadedly engage the rim engaging members 8 and 9.

A handle 11 is secured to the threaded member 7 so that the same may be rotated. In order to maintain the rim engaging members in alignment with each other I provide a rod 12 which is secured as at 13 in one of the rim engaging members and has slidable engagement with the other rim engaging member.

At 14, I have shown a spacer bar which is secured to the parallel members 5 and 6 and has freely mounted thereon hooks 16 and 17 and a cam member 18.

By viewing Figure I, it will be noted that one extremity of each of the parallel members 5 and 6 is curved as shown at 19 and that they are pivoted as at 21 to handles 22 and 23.

A screw-threaded member 24 is positioned between the handles 22 and 23 and is provided with right and left end threads and carries thereon rim engaging members 26 and 27. These rim engaging members and screw-threaded member function in the same manner as above described for the former rim engaging members. A handle 28 is secured to the screw-threaded member 24 for the purpose of rotating the same, while a bar 29 retains the rim engaging members 26 and 27 in their proper alignment.

The manner of operating my device is as follows:—

Assuming that it is desired to remove a rim from an automobile tire, the device is secured to the rim 31 so that the rim engaging members 8 and 9 clamp on the rim upon one side of the break 32, while the rim engaging members 26 and 27 engage the rim upon the opposite side of the break and at a point adjacent thereto, as shown in Figure I. By now raising the handles 22 and 23, the parallel members 5 and 6 may be dropped a sufficient distance to permit the cam 18 to be arranged so as to contact the under surface of the rim in such a manner that downward pressure will be exerted on the bar 14. By now pushing downwardly upon the handles 22 and 23 downward pressure will be transmitted to the end of the rim B. This is permitted by the fact that the parallel members 5 and 6 are held against upward movement by the cam 18 bearing on the under surface of the rim. If the tire valve is positioned adjacent the break, the cam is left in the position shown in Figure II, which results in the end B of the rim being depressed a sufficient distance to pass under the valve stem.

If the valve is located a considerable distance away from the break, the cam is kicked out as soon as the initial breaking down action of the rim has occurred. This results in an easier action of the tool.

By carrying the handles 22 and 23 to the position shown in Figure III, it will be noted that the rim has been fully contracted with the end B underlying the opposite end of the rim a considerable distance.

When it is desired to release the rim, the rim is again inserted in the tire, with the tool still in the position shown in Figure III. The handles are now returned to the position shown in Figure II and then to the position shown in Figure I.

Should it happen that the ends of the rim do not align with each other the hooks 16 and 17 are then engaged with the rim as shown in Figure IV after which an upward pull upon the handles 22 and 23 will transmit a downwardly pull upon the parallel members 5 and 6, but as they are locked to the rim by the hooks 16 and 17, they are immovable and consequently the end B of the rim will be forced upwardly into place.

Should the rim be bent so that one side of the rim is higher or lower than the other, then by manipulating the handles, as for instance, the handle 22 upwardly and the handle 23 downwardly a twisting action will be transmitted to the rim so that the ends will be accurately aligned, after which they can be locked in the customary manner.

It is to be understood that the form of my invention herewith shown and described is to be taken as a preferred example of the same, and that various changes relative to the size, shape and arrangement of parts may be resorted to without departing from the spirit of the invention or the scope of the subjoined claims.

Having thus described my invention, I claim:—

1. In a rim removing tool, a pair of parallel spaced members, a handle pivoted to each of said parallel spaced members, clamping means interposed between said parallel spaced members and said handles, a spacer bar positioned between said parallel spaced members, a pair of rim engaging hooks freely movable upon said bar, and a cam freely positioned on said bar between said hooks.

2. In a rim removing tool, a pair of parallel spaced members, a threaded member positioned between said parallel spaced members and adjacent one end thereof, said threaded member having oppositely disposed threads thereon, rim engaging members positioned on said threaded member, means for maintaining said rim engaging members in alignment with each other, means for rotating said threaded member, a spacer bar positioned between said parallel members, rim engaging hooks freely mounted on said bar, a cam freely mounted on said bar and positioned between said rim engaging hooks, a handle pivotally secured to each of said parallel spaced members and the opposite end thereof from said threaded member, a screw threaded member positioned between said handles, said screw threaded member having oppositely formed threads thereon, a pair of rim engaging members positioned on said screw threaded member, means for retaining said rim engaging members in alignment with each other, and means for rotating said screw threaded member, for the purpose specified.

In testimony whereof I affix my signature.

PURLEY V. MORGAN,